April 15, 1941.  H. C. HOWSAM  2,238,731

SPOOL

Filed Jan. 12, 1940

Inventor
HILYARD C. HOWSAM.
by Charles H. Wills
Atty.

Patented Apr. 15, 1941

2,238,731

UNITED STATES PATENT OFFICE 2,238,731

SPOOL

Hilyard C. Howsam, Chicago, Ill., assignor to Hubbard Spool Company, Chicago, Ill., a corporation of Illinois Application January 12, 1940, Serial No. 313,517

1 Claim. (Cl. 242—123)

My invention relates to spools or bobbins particularly adaptable for supporting thread, yarn, cordage, or other textile material which is to be steamed, dried, or otherwise treated. This type of spool is usually constructed of sheet metal and the barrel and heads have perforations for the free flow of the treating medium in contact with the material on the spool. Usually a circular row of perforations is provided in the heads in alignment with the barrel ends, and the central portions of the heads surrounded by these openings support an arbor tube extending through the barrel. Where the ends of the arbor tube project beyond the heads to form trunnion supports for the spool, blows or bumps axially against the arbor tube ends may tend to deflect or distort the middle portions of the heads which support the arbor tube, and the important object of this invention is to provide simple means for preventing such distortion or deflection and materially strengthening the spool.

On the accompanying drawing, I have disclosed a spool to which my invention has been applied, and in this drawing.

Figure 1:
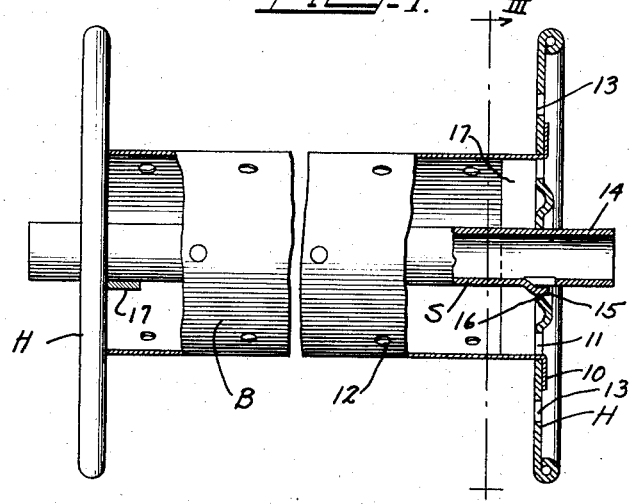
Figure 1 is a side elevation of the spool partly in diametral section.

The spool shown comprises a cylindrical barrel B, the end disks or heads H, and a spindle tube S, all these parts being of sheet metal. The barrel at its ends has tongues 10 which extend through the outer ends of openings 11 in the heads and are deflected outwardly against the heads and may be secured thereto as by spot welding. The barrel has perforations 12, these perforations together with the openings 11 in the heads, and other openings 13 in the heads providing for adequate circulation through the spool and in engagement with the material on the spool of steam, heat, air, or other treating medium.

The spindle tube S extends axially through the barrel and through openings in the heads H to project a distance beyond the heads to provide trunnions or bearing ends 14 for supporting the spool on bearing forks or other supports.

Figure 2:
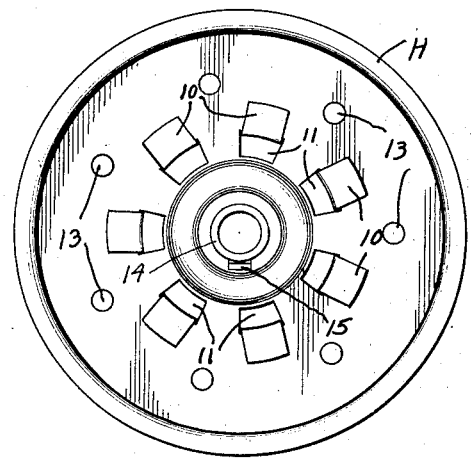
Figure 2 is an outside end view.
Figure 3:
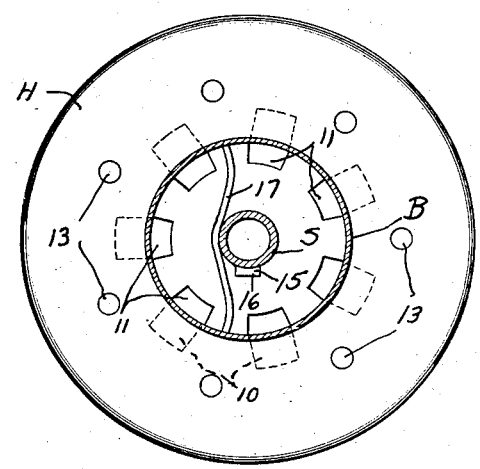
Figure 3 is a section on plane III—III Figure 1.
Figure 4:
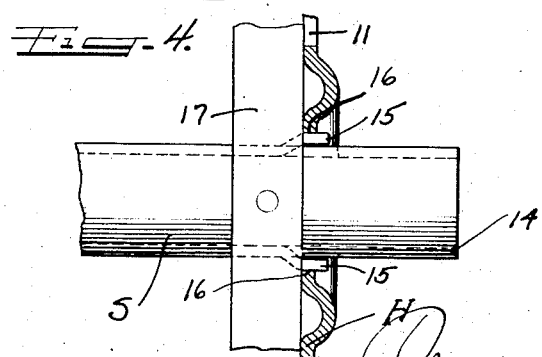
Figure 4 is an enlarged view of one end of the spool partly in section to more clearly show the arrangement.

To lock the heads to the spindle tube against relative rotation, rectangular sections 15 of the tube are deflected outwardly to form keys for receiving key slots 16 in the respective heads. Figures 1 to 3 show one of such keys provided and Figure 4 shows two such keys on the spindle tube.

The circular row of comparatively large passageways 11 in the heads will more or less weaken the central portions of the heads through which the spindle tube extends, and any blows or bumps axially against the spindle tube ends will affect these central portions and tend to deflect or distort them. To strengthen the spool against such deflection or distortion, I preferably provide abutment or brace members 17 which may be in the form of sheet metal plates secured to the spindle tube as by spot welding and extending diametrally inside the barrel to form a backing for the central portions of the heads between the openings 11, the ends of the backing plates terminating preferably between openings 11.

With the construction and arrangement disclosed, when the barrel tongues 10 are deflected and secured against the outer sides of the heads, the heads will be clamped intimately against the backing or brace members 17. Now when a projecting trunnion end 14 of the spool receives an axial blow or bump, such blow will be transmitted through the spindle tube to the brace or backing member 17 at the other end of the spool and by this brace member against the corresponding head outside of the central portion of said head which is surrounded by the openings 11, and the head central portion will be held against deflection or distortion. As the brace members extend up to the inner side of the barrel, the barrel will also absorb a considerable part of the blow to resist deflection and distortion of the head middle portions.

I thus produce a simple and efficient spool of the class described in which the portions of the head which have been weakened by perforations are strengthened and braced by simple means so as to prevent deflection or distortion under bumps or blows. I do not, however, desire to be limited to the exact construction and arrangement shown and described as changes and modifications may be made without departing from the scope of the invention.

I claim as follows:

A spool of the class described comprising a sheet metal barrel and sheet metal heads secured to the ends thereof, said heads having perforations surrounding the middle portions thereof and communicating with the inside of the barrel, a sheet metal spindle tube extending through said barrel and through said middle portions, key and slot connections between said heads and spindle tube, and brace members in the form of metal plates extending across the inside of said barrel and welded to said spindle tube in planes at right-angles to said heads to abut and to extend substantially diametrally across said middle portions and beyond said openings to form rigid backings for said middle portions to prevent deflection or distortion thereof under blows against the ends of said spindle tube.

HILYARD C. HOWSAM.